United States Patent
Jost et al.

(10) Patent No.: US 8,881,597 B2
(45) Date of Patent: Nov. 11, 2014

(54) MEASURING DEVICE INCLUDING DETECTION OF DEFORMATIONS

(75) Inventors: Oliver Jost, Langen (DE); Marko Appel, Bundingen (DE); Joachim Hose Von Wolframsdorff, Alsbach (DE)

(73) Assignee: Tecsis GmbH, Offenbach (DE)

( * ) Notice: Subject to any disclaimer, the term of this patent is extended or adjusted under 35 U.S.C. 154(b) by 91 days.

(21) Appl. No.: 12/994,937

(22) PCT Filed: Sep. 30, 2009

(86) PCT No.: PCT/IB2009/054275
§ 371 (c)(1),
(2), (4) Date: Aug. 10, 2011

(87) PCT Pub. No.: WO2011/039566
PCT Pub. Date: Apr. 7, 2011

(65) Prior Publication Data
US 2011/0283804 A1  Nov. 24, 2011

(51) Int. Cl.
*G01B 5/00* (2006.01)
*G01L 1/04* (2006.01)
*G01L 1/22* (2006.01)
*G01L 7/08* (2006.01)

(52) U.S. Cl.
CPC ............ *G01L 1/2206* (2013.01); *G01L 1/2262* (2013.01); *G01L 1/2268* (2013.01); *G01L 7/082* (2013.01)
USPC ...................................... 73/774; 73/862.451

(58) Field of Classification Search
CPC .................................................... G01L 5/167
USPC ......... 374/130–131, 161, 137, 110, 112, 100, 374/30, 117–119, 45, 46; 73/655, 514.26, 73/862.044, 150 R, 781, 794, 818
See application file for complete search history.

(56) References Cited

U.S. PATENT DOCUMENTS

| | | | | |
|---|---|---|---|---|
| 4,321,578 A * | 3/1982 | Nagasu et al. | ................. | 338/42 |
| 4,827,240 A * | 5/1989 | Hafner | ................. | 338/2 |
| 5,535,631 A * | 7/1996 | Paine | ................. | 73/855 |
| 6,021,673 A * | 2/2000 | Takeuchi et al. | ................. | 73/754 |
| 6,075,585 A * | 6/2000 | Minne et al. | ................. | 355/71 |
| 6,279,402 B1 * | 8/2001 | Fisher | ................. | 73/754 |
| 6,289,738 B1 * | 9/2001 | Zabler et al. | ................. | 73/726 |
| 6,647,797 B2 * | 11/2003 | Miodushevsky | ................. | 73/774 |
| 6,789,431 B2 * | 9/2004 | Ishio | ................. | 73/754 |
| 6,951,143 B1 * | 10/2005 | Adderton et al. | ........ | 73/862.044 |
| 7,146,862 B2 * | 12/2006 | Kosht et al. | ................. | 73/777 |
| 7,164,342 B2 * | 1/2007 | Nakao et al. | ................. | 338/47 |
| 7,360,456 B2 * | 4/2008 | Morimoto | ............. | 73/862.044 |
| 7,694,586 B2 * | 4/2010 | Rey | ............. | 73/862.042 |
| 2007/0277621 A1 * | 12/2007 | Schlachter et al. | ............ | 73/774 |
| 2008/0066555 A1 * | 3/2008 | Rezgui et al. | ................. | 73/716 |
| 2009/0056462 A1 * | 3/2009 | Kaneko et al. | ................. | 73/720 |

* cited by examiner

*Primary Examiner* — Lisa Caputo
*Assistant Examiner* — Nasir U Ahmed
(74) *Attorney, Agent, or Firm* — Ladas & Parry, LLP

(57) ABSTRACT

A measuring device is described which has a metal body deformable in accordance with a value to be measured. A sensor element having a metal carrier and ohmic resistors formed thereon in metal thin-film technique is connected to the metal body by welding and generates a signal adapted to be electrically evaluated which corresponds to the deformation of the metal body. The weld for connecting the metal body and the sensor element completely encloses the metal carrier at its circumference. The metal body has, at the welded connection with the metal carrier, a material thickness t which is completely penetrated by the weld. The value to be measured by the measuring device comprises force, pressure, temperature, torque or combinations thereof.

16 Claims, 7 Drawing Sheets

WHEATSTONE - BRIDGE CIRCUIT

ARRANGEMENT OF THE BRIDGES

TOP VIEW

ALIGNMENT ACCORDING TO x AND y DIRECTION

ARRANGEMENT OF THE BRIDGES

TOP VIEW

SENSOR ELEMENT

ALIGNMENT OF BRIDGE 1 ACCORDING TO
x AND y AND OF BRIDGE 2 ACCORDING TO
± 45°, FOR INSTANCE, WITH RESPECT TO
THE x AND y DIRECTION

ARRANGEMENT OF THE BRIDGES

TOP VIEW

SENSOR ELEMENT

ALIGNMENT ACCORDING TO ± 45° WITH RESPECT
TO x AND y OF BOTH BRIDGES

ARRANGEMENT OF THE BRIDGES

TOP VIEW

SENSOR ELEMENT

ALIGNMENT OF TWO BRIDGES ± 45° WITH RESPECT
TO THE x AND y DIRECTION AND ONE BRIDGE IN
THE x AND y DIRECTION.

MEASURING DEVICE INCLUDING DETECTION OF DEFORMATIONS

CROSS-REFERENCE TO RELATED APPLICATIONS

This application is the U.S. National Stage of International Patent Application No. PCT/IB2009/054275 filed on Sep. 30, 2009 and claims priority thereto, disclosures of which is hereby incorporated by reference in its entirety.

The invention relates to a measuring device for measuring physical values such as force, pressure, temperature, torque or combinations thereof. In this measuring device deformations of a body made of metal to which the value to be measured is applicable are electrically detected by means of changes of ohmic resistances due to deformation.

A generic measuring device operating in accordance with this principle is known, for instance, from DE 10 2006 004 285 A1. A strap-shaped metal body has a hole in the center into which a cup-shaped sensor element is inserted. The sensor element is provided on its cover surface with a sensor circuit including a strain gauge which is applied to be insulated by glass layers, the sensor circuit being in the form of a Wheatstone bridge circuit including resistors in metal thin-film technique. The sensor element is welded with the metal body along its circumference in the area of the upper and lower side faces of the strap-shaped metal body. The weld extends somewhat into the material thickness of the metal body.

In the area of the roots of the welds this welding can produce material tensions which may impair the accuracy of measurement or reduce the service life. Moreover, a welding of the sensor element from both sides of the strap-shaped metal body is necessary, which increases either the handling effort for the workpiece or the effort in terms of equipment for the manufacture.

Furthermore, from DE 195 27 687 A1 a sensor is known which has thin-film resistors applied to a measuring membrane arranged in the form of two Wheatstone bridges at such positions of the measuring membrane that two resistors of a bridge are arranged in the area of the compressing of the loaded membrane while the other resistors are arranged in the area of the elongation of the loaded membrane. This is to detect changes which on the whole impair the redundant measuring bridge arrangements but cannot be detected solely by comparing the two bridges, as they relate equally to both bridges, such as e.g. ageing, material fatigue, corrosion etc.

Based on the closest prior art, the object underlying the invention is to suggest a measuring device that is easy to manufacture and provides high measuring accuracy with a long service life.

This object is achieved by a measuring device comprising the features of claim 1. Advantageous configurations of the invention are illustrated in the dependent claims.

The measuring device according to the invention has a metal body adapted to be deformed in accordance with a value to be measured. Depending on the design and the use of the metal body, bending forces, tensile forces, pressure forces, torques or else thermal expansions which can have different causes to be measured can occur in the metal body. The value to be measured thus can be the direct or indirect cause of the deformation of the metal body so that there is a connection between the deformation of the metal body and the cause thereof (i.e. the value to be measured) and admits the conclusion to the value to be measured.

The measuring device further comprises a sensor element including a metal carrier and ohmic resistors formed thereon in metal thin-film technique, the sensor element being connected to the metal body by welding and generating a signal to be electrically evaluated which corresponds to the deformation of the metal body. Ohmic resistors the resistance of which varies with a deformation are widely used in the form of a strain gauge. In the present case the resistors are formed in a known metal thin-film technique on the sensor element and are fixedly connected with the same. This technology has the advantage that the resistors are connected to the metal carrier of the sensor on a so-to-speak atomic level so that creeping effects etc., which may be due to the separation of the resistors from the (metal) carrier, are safely prevented.

In the welded state the weld completely encloses the metal carrier of the sensor and at the welded joint with the metal carrier the metal body has a material thickness t which is completely penetrated by the weld. In this way, a connection can be provided between the metal body and the metal carrier starting out from one side of the metal body only so that it is not necessary to turn the metal body, repeatedly position the same and then perform a second welding.

Moreover, the configuration according to the invention has the advantage that in the weld the entire material of the metal body was melted for forming the weld so that residual tensions at the weld root can be considerably reduced. Between the metal carrier of the sensor and the metal body an exclusively liquid zone was formed during welding which now can uniformly solidify across the material thickness of the metal body.

In this way, the metal carrier of the sensor element is neutrally clamped so that the directionally correct detection of deformations is possible with high accuracy and a long service life.

Preferably the material thickness t of the metal body is within the range of 0.2 to 1.2 mm. Equally preferred, the metal carrier of the sensor element has an outer diameter of 5 to 15 mm.

In an advantageous configuration the metal carrier is provided at its circumference with a flange the material thickness of which is substantially equal to the material thickness of the metal body in the area of the welding point—viz. t—wherein the weld is a butt joint. Alternatively the metal carrier is cup-shaped and the flange is axially confined by a circumferential groove introduced into the cup wall.

With respect to the electric and physical arrangement of the ohmic resistors on the sensor element especially the following advantageous configurations are mentioned: The resistors of the sensor element are wired with each other for forming at least two Wheatstone full bridges. Each Wheatstone bridge is equipped with four or five electric connecting surfaces on the sensor element for connecting an evaluating unit. At least two resistors of a Wheatstone bridge are formed by two serially switched resistors between which an electric connection is provided to which a variable resistance can be applied in order to adjust the zero point of the bridge voltage. This variable resistance can optionally be connected to the Wheatstone bridge so as to specifically unbalance the bridge. Thus it is achieved that the signal of the unbalanced bridge can be specifically supplied to the evaluating unit which is designed to check itself by way of this signal.

In the case of arranging plural Wheatstone bridges it is advantageous when the resistors of each bridge are arranged in pairs at right angles with respect to each other on the sensor element and the individual bridges are arranged to be differently aligned relative to each other. When the bridges are arranged to be offset by 90° relative to each other, deformations of the metal body perpendicular to each other are basically directly detectable. When two bridges are provided which are arranged to be offset by 45° relative to each other, this consideration applies to deformations aligned at a 45° angle.

In an advantageous configuration also more than two bridges can be provided, for instances two bridges can be arranged to be offset by 90° relative to each other and a further bridge is arranged to be offset by 45° vis-à-vis the two bridges arranged perpendicularly to each other. An arrangement of bridges in which two pairs of bridges are provided which have bridges arranged to be offset by 90° relative to each other, wherein the two pairs of bridges are arranged to be offset by 45° relative to each other. Thus the deformations can be correspondingly detected.

Hereinafter the invention will be explained in detail by way of preferred embodiments with respect to the schematic drawing, in which FIG. 1 shows a sectional view of a first embodiment of a sensor element welded in a metal body;

Figure 1:
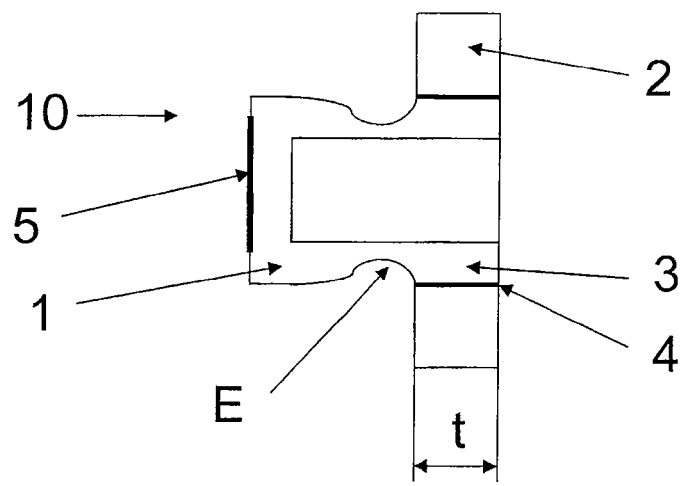

FIG. 1 shows a section across a sensor element 10 mounted in a metal body 2. The sensor element 10 has a cup-shaped metal carrier 1 including a groove E at its circumference so that a flange portion 3 is formed which is connected to the metal body 2 by means of a weld 4. The deformable metal body 2 has a substantially strap-shaped design not shown in this schematic sectional view into which a bore is introduced in which the sensor element 10 is inserted. The material thickness or sheet thickness of the deformable metal body 2 is denoted with t in the representation of FIG. 1 and is within the range of from 0.2 to 1.2 mm. The cup-shaped metal carrier 1 of the sensor element 10 forms the mentioned flange 3 the axial thickness of which corresponds approximately to the material thickness t of the deformable metal body 2. As is clearly visible in FIG. 1, the weld 4 is disposed such that it penetrates the entire material of the metal body 2 in the direction of thickness thereof. The groove E ensures that the heat developed during welding by the laser beam does not significantly propagate in the metal carrier 1 so that the weld 4 is separated spatially and thermally from the sensor system 5 (not shown) of the sensor element 10 disposed on the cover surface on the left in FIG. 1 of the cup-shaped metal carrier 1.

Figure 2:
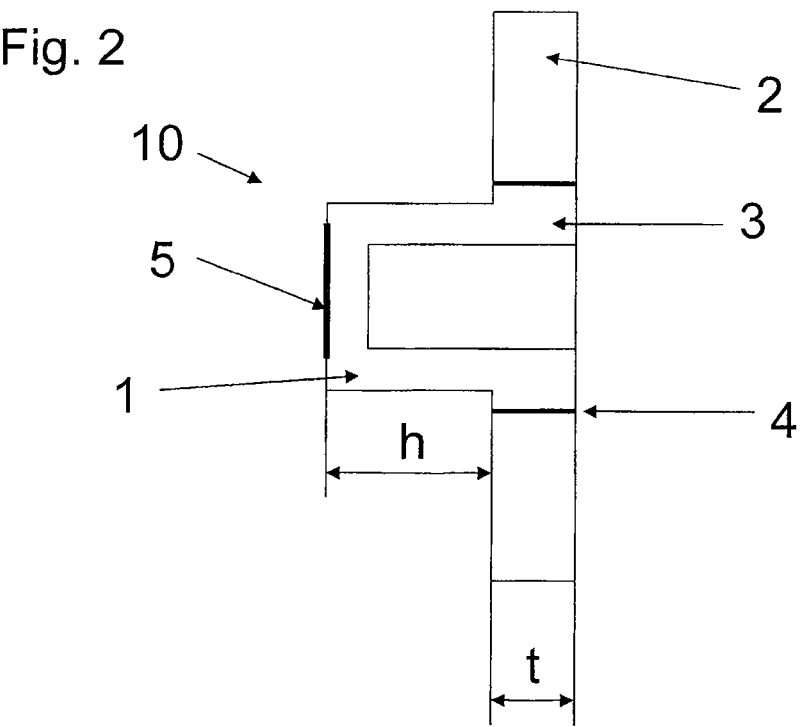
FIG. 2 shows a sectional view of a second embodiment of a sensor element welded in a metal body.

In an alternative configuration of the invention shown in FIG. 2 a sensor element 10 which equally forms a flange 3 connected to the surrounding metal body 2 by means of a weld 4 is inserted in a metal body 2. In contrast to the configuration according to FIG. 1, in this case the flange 3 is formed as a radially extending portion of a cup-shaped metal carrier 1 of the sensor element 10. Similarly to the embodiment of FIG. 1, in this case, too, the material thickness of the flange 3 is adapted to the material thickness of the deformable metal body 2 so that both have approximately the material thickness t. Also in this example the material thickness t can be between 0.2 and 1.2 mm. Furthermore, in FIG. 2 the sensor system 5 of the sensor element 1 is indicated which is disposed on the left side in FIG. 2 on the cover surface of the cup-shaped metal carrier 1. The cover surface including the sensor system 5 is arranged at a distance h from the facing surface of the metal body 2 or the facing surface of the flange portion 3 of the metal carrier 1. This distance h is selected such that both the mounting of evaluating electronics and the lever conditions for the detection of the deformations of the deformable metal body 2 are optimized. In this embodiment, too, the weld 4 extends in the direction of thickness completely through the metal body 2. The distance h is within the magnitude range of t and can be especially 0.2 to 2 mm.

Figure 3:
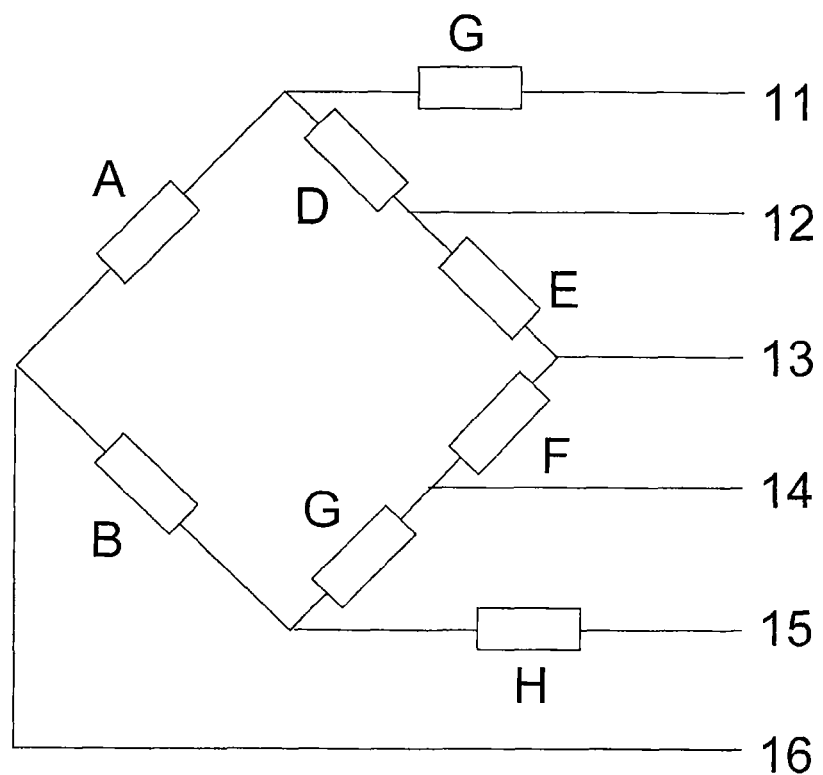
FIG. 3 shows a Wheatstone bridge circuit adapted to be used with the invention.

In FIG. 3 an exemplary arrangement of ohmic resistors in a Wheatstone bridge circuit is shown which are formed as a sensor system 5 on the metal carrier 1 of the sensor element 10 in thin-film technique. It has to be mentioned that also several of these bridge circuits can be formed on the same sensor element and in different alignments with respect to each other, as will be illustrated in detail hereinafter with reference to the FIGS. 5 to 8. FIG. 3 shows a Wheatstone bridge including a total of six resistors A, B, C, D, E, F. The resistors A and B are disposed at right angles to each other, while the resistor groups D, E and C, F are likewise arranged at right angles to each other. In order to obtain the square arrangement the resistor group D, E is arranged in parallel to the resistor B and the resistor group C, F is arranged in parallel to the resistor A. The further resistors G, H shown in FIG. 3 serve for compensating the temperature. In a known manner the shown resistors A to H are connected to connecting points 11, 12, 13, 14, 15, 16. The pickoffs 12 and 14 are arranged between the resistors D, E and C, F, respectively, switched in series. The bridge voltage is picked off between the contacts 13 and 16, while the connecting surfaces 12 and 14 can be used to balance the bridge.

Figure 4:
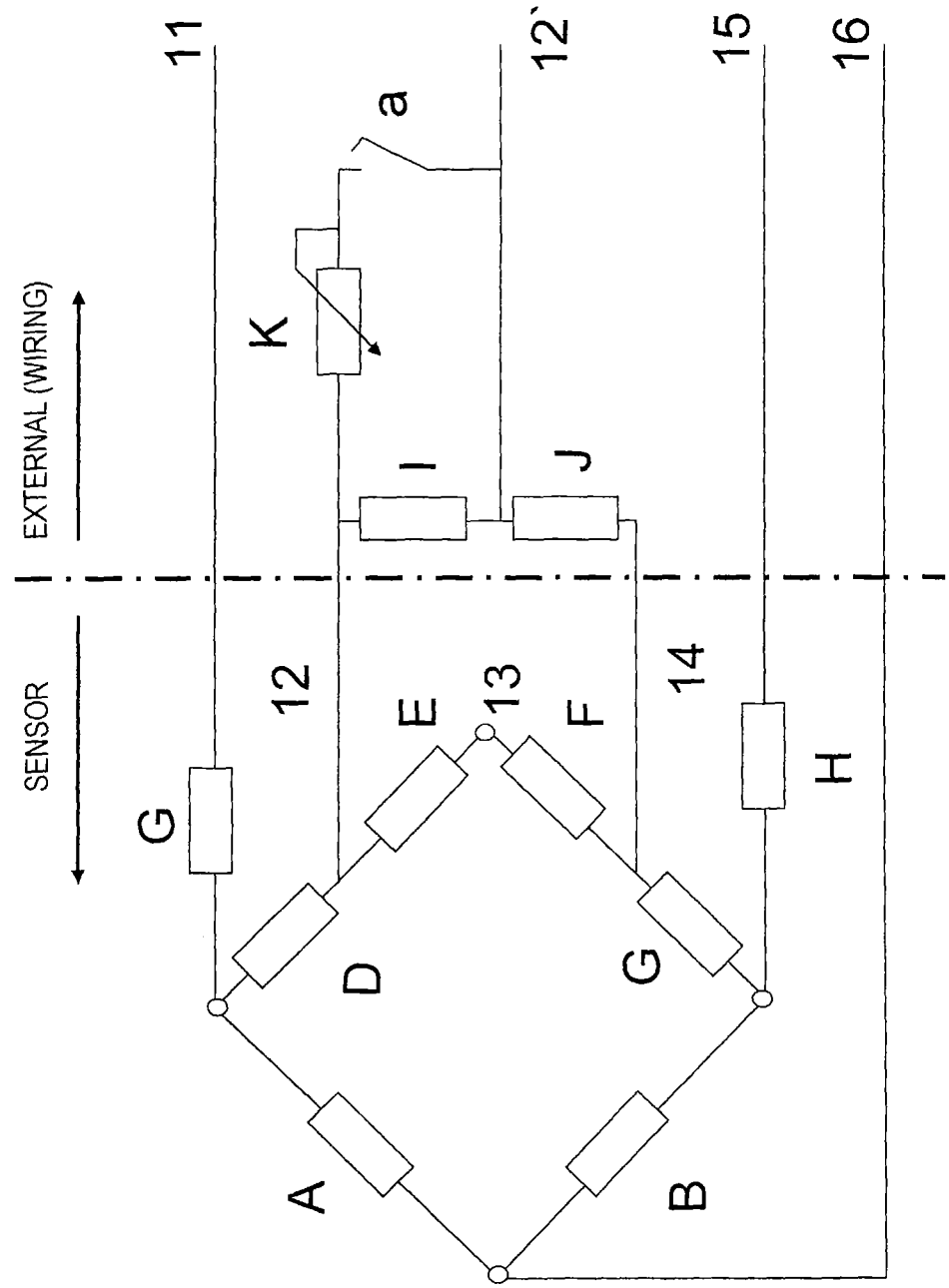
FIG. 4 shows an external wiring of the bridge circuit of FIG. 3 adapted to be used with the invention.

FIG. 4 shows the wiring of the Wheatstone bridge circuit according to FIG. 3 shown on the left side of FIG. 4 which has been explained in detail already. The bridge circuit on the left of the dash-dotted line is arranged on the sensor, while on the right of this dash-dotted line in FIG. 4 the external circuit is schematically shown. In addition to the afore-mentioned resistors A to H, the resistors J, I and K are provided. K is an adjustable resistor. The resistors I and J are connected in series to each other and in parallel to the resistors E and F. Between the two resistors I and J a pickoff 12' is provided which is adapted to be connected via a switch a to the one end of the resistor K which is connected at its other end to the connecting point 12 or the resistor I. The resistor K serves for specifically detuning the bridge.

In the present embodiment the parallel circuit of the resistors I and K in series with the resistor J can be interrupted or switched off by the switch a so that only the resistors I and J are switched in series to each other and in parallel to the resistors E and F. This measure referred to as specific detuning of the bridge can now be used, in cooperation with an appropriate evaluating unit, to evaluate the response of individual components to this signal change to the effect that a correct functioning state or a malfunction of these components can be detected. In other words, it is possible by this bridge adapted to be specifically unbalanced to check the operability of the evaluating unit independently of the change of the resistors in the bridge itself. Even if a wrong measurement by the bridge was given, the difference of the signal in the case of a balanced bridge and an unbalanced bridge is a sufficiently accurately set signal value which permits this analysis of the evaluating electronics.

In addition to the above remarks, it is referred to the fact that further resistors can be provided in the bridge or else in the evaluating unit which then can take over functions such as temperature compensation or the like. For instance, the resistors E and F are balancing resistors adapted to be fixedly set by means of laser trimming for balancing the bridge. The resistors G and H inserted in the supply portion of the bridge form compensating resistors for the temperature response of the Young's modulus of the material of the sensor body and the metal body (2), i.e. they serve for compensating the temperature dependence of the sensor.

Each of the FIGS. 5, 6, 7 and 8 shows a schematized top view of the cover surface of a sensor element including resistors disposed thereon. They show merely the basic arrangement and orientation of the resistors within the individual bridges. The resistors of one group are denoted with A, B, C, D, A', B', C', D' or A'', B'', C'' and D''. As a matter of course, all these bridges can be designed in accordance with the foregoing remarks on FIG. 3 and FIG. 4 and, consequently, can also include all the resistors thereof and an appropriately designed evaluating unit as well as an adequate connecting mimic. The resistors are applied in thin-film technique and are insulated against the carrier material (metal carrier) by means of glass insulation.

Figure 5:
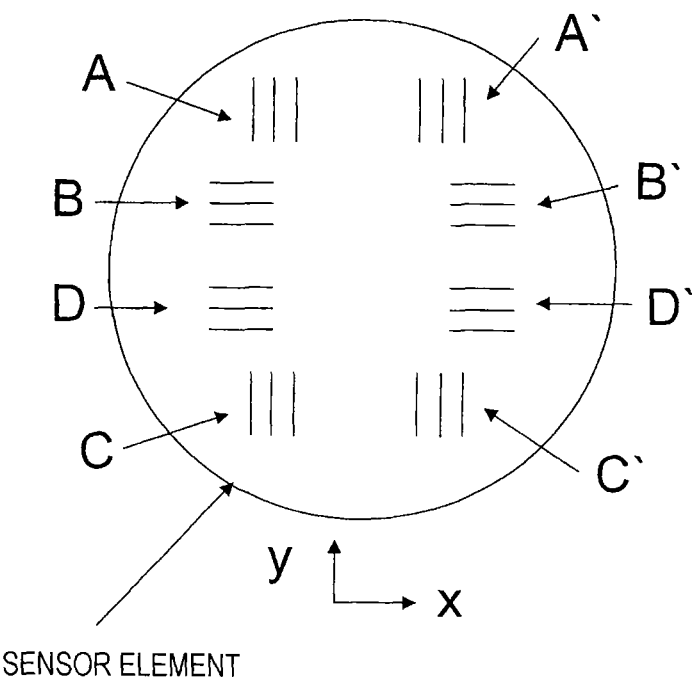
FIG. 5 is an exemplary arrangement of two Wheatstone bridge circuits on the sensor element adapted to be used with the invention.

In FIG. 5 a so-called x and y direction arrangement of the bridges is shown, i.e. the individual pairs of resistors AC, A'C'; BD, B'D' of the respective bridge are perpendicular to each other, wherein in each case two bridge pairs AC, A'C'; BD, B'D' of two bridges are arranged in parallel to each other. In this way deformations or components thereof can be directly measured in accordance with their direction offset by 90° with respect to each other.

Figure 6:
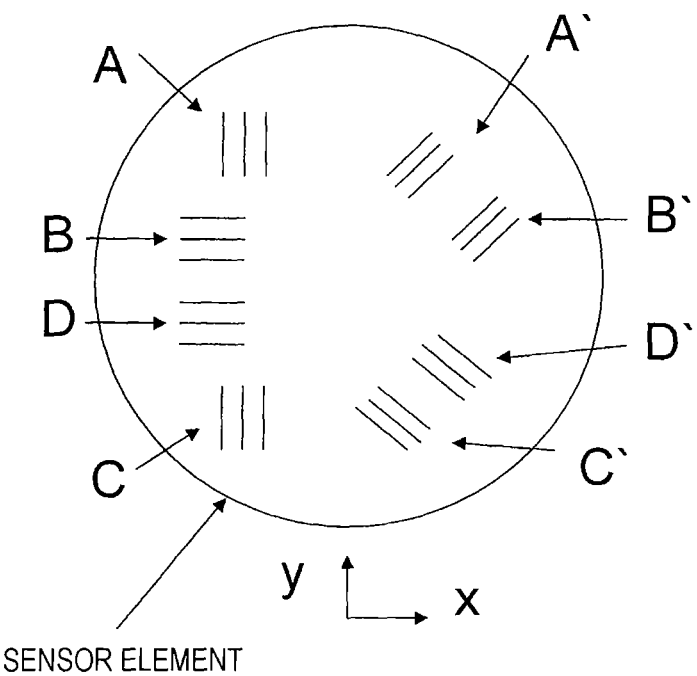
FIG. 6 is a further exemplary arrangement of two Wheatstone bridge circuits on the sensor element adapted to be used with the invention.

In FIG. 6 an arrangement is made in which the bridge resistors A, B, C, D of the left bridge are arranged just as the resistors A, B, C, D in the left bridge of FIG. 5. Although in the right bridge of FIG. 6 the resistors A', B', C', D' are disposed at right angles with respect to each other, they are arranged at an angle of 45° with respect to the pairs of resistors AC, BD of the first bridge, however. In this manner, the one bridge measures in the x and y direction, while the other bridge directly measures deformations in the direction offset with respect thereto by 45 degrees.

In FIG. 7 again similar bridges including pairs AC, BD, A'C', B'D' of resistors perpendicular to each other are formed; all of these are arranged to be offset by 45 degrees with respect to the x-y direction of the sensor, however, i.e. the resistors A and B are arranged in parallel to the resistors D' and C' and the resistors A', B' are arranged in parallel to the resistors C and D. This permits a redundant measurement in the directions of 45 degrees relative to x and y.

Figure 7:
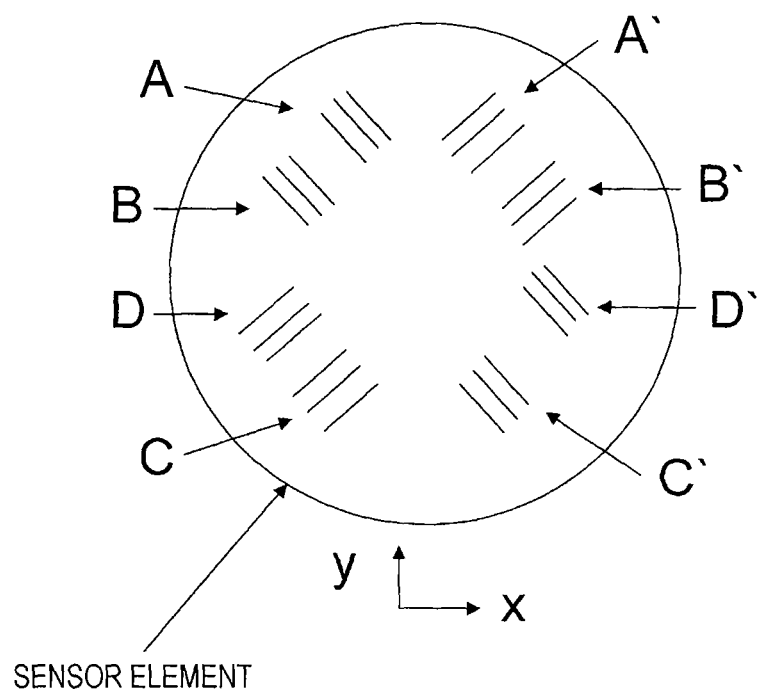
FIG. 7 shows another exemplary arrangement of two Wheatstone bridge circuits on the sensor element adapted to be used with the invention.
Figure 8:
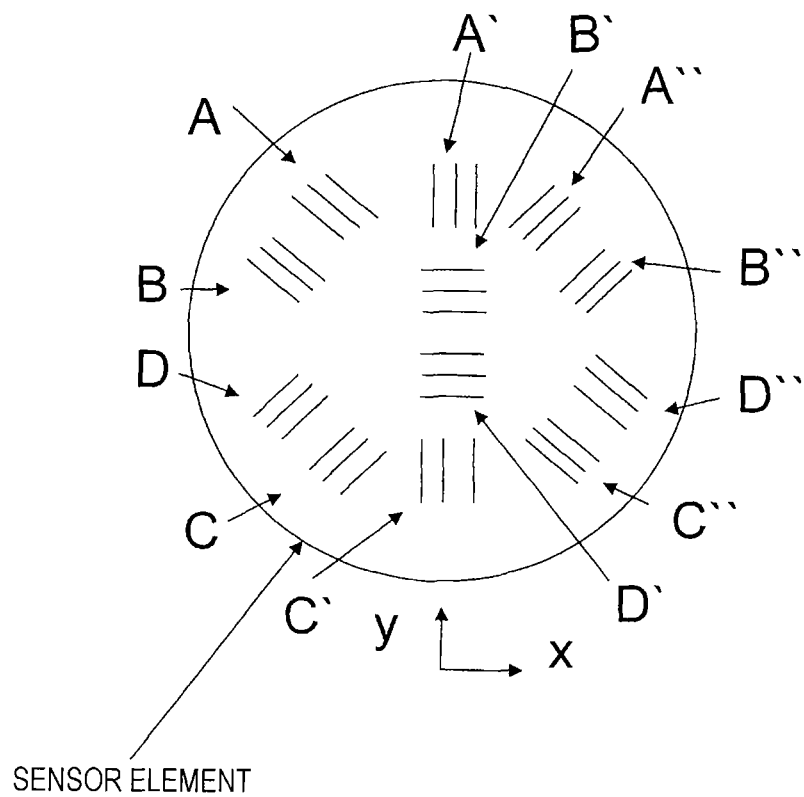
FIG. 8 shows an exemplary arrangement of three Wheatstone bridge circuits on the sensor element adapted to be used with the invention.

Finally, FIG. 8 provides another modification with a third Wheatstone bridge which, based on the configuration of FIG. 7, is disposed between the bridges arranged at 45 degrees with respect to the principal axes x, y perpendicularly in the x-y direction. In this way, a redundant measurement of 45 degrees with respect to the x-y direction and an additional measurement in the x and y direction are possible.

The invention claimed is:

1. A force measuring device comprising:
   a metal body deformable in accordance with a value to be measured, a sensor element having a metal carrier and ohmic resistors formed thereon in metal thin-film technique, the sensor element being connected to the metal body by welding and generating a signal adapted to be electrically evaluated corresponding to the deformation of the metal body, wherein the metal carrier is neutrally clamped by the metal body through a uniformly solidified liquid zone formed during welding between the metal carrier and the metal body across the material thickness t of the metal body, and
   at the welded connection with the metal carrier, the material thickness t of the metal joint and the metal carrier, and the welded joint completely encloses the metal carrier at its circumference.

2. The measuring device according to claim 1, wherein the value to be measured is associated with a force or torque or combinations thereof.

3. The measuring device according to claim 1, wherein the material thickness t is within the range of from 0.2 to 1.2 mm.

4. The measuring device according to claim 1, wherein, at its circumference, the metal carrier is provided with a flange the material thickness of which is substantially equal to t, the welded joint being a butt joint.

5. The measuring device according to claim 4, wherein the metal carrier is cup-shaped and the flange is axially confined by a circumferential groove introduced into the cup wall.

6. The measuring device according to claim 1, wherein the metal carrier of the sensor element has an outer diameter of 5 to 15 mm.

7. The measuring device according to claim 1, wherein the resistors of the sensor element are wired with each other for forming at least one Wheatstone full bridge and supply a signal which is proportional to the elongation of the sensor element.

8. The measuring device according to claim 7, wherein each Wheatstone bridge is provided with four or five electric connecting surfaces on the sensor element for connecting an evaluating unit.

9. The measuring device according to claim 7, wherein at least two resistors of a Wheatstone bridge are formed by two resistors switched in series between each of which an electric connection is provided to which a variable resistor K can be applied in order to specifically unbalance the Wheatstone bridge.

10. The measuring device according to claim 9, wherein the signal of the unbalanced bridge is supplied to the evaluating unit which is designed to check itself by way of this signal.

11. The measuring device according to claim 1, wherein the resistors of the sensor element are wired with each other for forming at least two Wheatstone full bridges and supply a signal which is proportional to the elongation of the sensor element.

12. The measuring device according to claim 1, wherein the resistors of each bridge are arranged in pairs, respectively, at right angles with respect to each other on the sensor element and, if more than one bridge is provided, the individual bridges are arranged so as to be differently aligned relative to each other.

13. The measuring device according to claim 12, wherein two bridges are provided which are arranged to be offset by 90° relative to each other.

14. The measuring device according to claim 12, wherein two bridges are provided which are arranged to be offset by 45° relative to each other.

15. The measuring device according to claim 12, wherein two bridges are provided which are arranged to be offset by 90° relative to each other and a further bridge is provided which is arranged to be offset by 45° vis-à-vis the two bridges arranged perpendicularly to each other.

16. The measuring device according to claim 12, wherein two pairs of bridges are provided which include bridges arranged to be offset by 90° relative to each other, wherein the two pairs of bridges are arranged to be offset by 45° relative to each other.

* * * * *